(12) United States Patent
Liu et al.

(10) Patent No.: US 9,077,177 B2
(45) Date of Patent: Jul. 7, 2015

(54) PORTABLE GROUND FAULT CIRCUIT BREAKER

(71) Applicant: SHANGHAI YUNYUAN ELECTRIC APPLIANCE CO. LTD, Shanghai (CN)

(72) Inventors: Guojiu Liu, Shanghai (CN); Jianguo Xue, Shanghai (CN); Yongxuan Yan, Shanghai (CN)

(73) Assignee: SHANGHAI YUNYUAN ELECTRIC APPLIANCE CO. LTD, Shanghai (CN)

( * ) Notice: Subject to any disclaimer, the term of this patent is extended or adjusted under 35 U.S.C. 154(b) by 0 days.

(21) Appl. No.: 14/235,649

(22) PCT Filed: Oct. 17, 2013

(86) PCT No.: PCT/CN2013/085358
§ 371 (c)(1),
(2) Date: Jan. 28, 2014

(87) PCT Pub. No.: WO2015/043007
PCT Pub. Date: Apr. 2, 2015

(65) Prior Publication Data
US 2015/0085405 A1 Mar. 26, 2015

(30) Foreign Application Priority Data
Sep. 24, 2013 (CN) .......................... 2013 1 0450127

(51) Int. Cl.
*H02H 3/00* (2006.01)
*H02H 3/16* (2006.01)
*H01H 73/44* (2006.01)
*H01H 83/02* (2006.01)
*H01R 13/713* (2006.01)

(52) U.S. Cl.
CPC ................. *H02H 3/16* (2013.01); *H01H 73/44* (2013.01); *H01H 83/02* (2013.01); *H01R 13/7135* (2013.01)

(58) Field of Classification Search
CPC ..... H02H 3/16; H02H 3/044; H01R 13/7135; H01H 83/02; H01H 73/44
USPC ....................................................... 361/42–50
See application file for complete search history.

(56) References Cited

U.S. PATENT DOCUMENTS

2005/0231861 A1* 10/2005 Power et al. ..................... 361/42
2012/0257316 A1* 10/2012 Kamor et al. .................... 361/50

* cited by examiner

*Primary Examiner* — Danny Nguyen
(74) *Attorney, Agent, or Firm* — Muncy, Geissler, Olds & Lowe, P.C.

(57) ABSTRACT

A portable ground fault circuit breaker includes a main housing. An interior housing in which moving and static contacts are disposed is disposed inside the main housing and includes a base and a base cover. The static contacts are hung in the interior housing. The moving contacts are disposed on an unbalancing moving contact frame. A trip lock is disposed at one end of the moving contact frame and connected to a fasten lock fulfilling the separation and connection of the moving and static contacts. A lower portion of the fasten lock penetrates the base to abut on a tripping solenoid disposed at an exterior bottom of the base. The solenoid and a main control circuit on a circuit board fulfill an electrical connection. A simple structure, a small bulk, use convenience, and a humanized appearance design are the effects.

13 Claims, 8 Drawing Sheets

PORTABLE GROUND FAULT CIRCUIT BREAKER

BACKGROUND OF THE INVENTION

1. Field of the Invention

The present invention relates to a protection device for electrical appliances, in particular a portable ground fault circuit breaker which interrupts the power of the load side automatically when there is a short circuit, an electricity leakage, an electricity shock, a ground fault, and a neutral ground fault. The breaker also possesses protection functions, such as a water-proof protection.

2. Description of the Related Art

In recent years, fire disasters caused by the short-circuited electrical appliances results in a great loss of human's lives and properties. A further development attendant on the science technique is that people start to design protection devices for these electrical appliances. However, these devices have a poor protection performance generally and provide a narrow application scope. Especially, most protection devices in the market do not have a short-circuited protection function or do not arrange a rational structure even if they have the short-circuited protection function. For example, the devices may lack a function of arc extinction, which creates electric sparks at time of closing, breaks the circuit and the load immediately, and reduces the use duration and comprehensive performances.

There is disclosed a prior art published by a China patent no. ZL 200810147046.0 and titled by "fire-proof and electricity-leakage proof protecting plug" with a short-circuited protection function. As referring to FIG. 1 which is a schematic view showing a tripping structure of the disclosure and FIG. 2 which is a circuit diagram of the disclosure, the prior art includes a tripping solenoid and a multifunctional protection auxiliary circuit installed on a base plate on which a moving iron core sleeved by tripping coils and a framework are all installed, an insulation plate fixedly disposed at a center of a moving contact sheet, a permanent magnet fixedly installed on a place where a pole of the insulation plate and a static iron core on a plug housing are attracted. When a load end of the plug has an overload, an overpressure, an electricity leakage, a short circuit, and/or the plug is overheated, a protection circuit controls the moving iron core for creating magnetism, and the magnetism and the magnetism of the permanent magnet are repulsive. This repulsion drives the permanent magnet to activate a downward motion of the insulation plate and the moving contact sheet, thereby causing a disjunction between the moving and the static contact points and fulfilling a tripping operation.

The above technique has a high sensibility and a quick power-off speed (e.g. power-off within 25 ms). However, the prior art only utilizes the tripping solenoid to fulfill the opening operation. The shortcoming attendant on the mechanism is that it needs enough certain maintenance force to keep the opening/closing state. In other words, when the permanent magnet drives the moving contact sheet to leave the static contact sheet, the moving iron core must reserve a generation of the strong magnetism repulsing the permanent incessantly for assuring the opening safety. However, once the opening operation is obtained, the strong current in the circuit would disappear and subsequently the moving iron core would lose the magnetism incessantly. Due to an elastic and transmutable U-shaped component disposed at one end where the moving contact sheet and the base plate are fixed, the permanent magnet on the insulation plate disposed on the component may be possibly attracted by the static iron core again without the force of incessant repulsion, and such attraction possibly would drive the moving and the static contact sheets to contact with each other again and cause the closing operation, which results in an extreme hidden trouble to the safety.

As referring to FIG. 2 of the disclosure, it is understood that the tripping solenoid is executed by a silicon controlled rectifier to attain the protection against the short circuit, overload, overpressure, electricity leakage or overheat, which however imposes on the silicon controlled rectifier heavily, affects the duration, and increases the hidden trouble to the safety, especially when the short circuit happens.

A further shortcoming is that when the moving contact sheet, the static contact sheet, and the tripping solenoid and the multifunctional protection auxiliary circuit installed on a base plate are all disposed in a smaller space, an electric arcs created by closing the moving and the static contact sheets would inevitably affect or even burn up the tripping solenoid and the multifunctional protection auxiliary circuit.

To solve the shortcomings attendant on the current technique, the inventor of the present invention develops a portable ground fault circuit breaker by combing his abundant technical experiences, the structure of which fulfills a decisive circuit-break effect by opening swiftly and safely, needs not an incessant current supply, and prevents the loss of electrical energy. The present invention also has a compact and scientific structure and possesses a water-proof protection and the function of protecting against the overload, the electricity leakage, the electricity shock, the ground fault and the neutral ground fault, and the short circuit.

SUMMARY OF THE INVENTION

To attain the above functions and solve the shortcomings of the current technique, the present invention provides a portable ground fault breaker which combines a tripping solenoid with a lever tripping mechanism skillfully and scientifically and has an extreme high stability and sensibility. The present invention does not create electric sparks and has a long duration. It is also not suitable for heating.

The technical problem solved by the present invention is obtained by the following technique:

A portable ground fault circuit breaker includes a main housing, charaterised in that an interior housing is further disposed inside the main housing and comprises a base and a base cover. The interior housing is fixedly disposed on a circuit board in the main housing via a base leg which is disposed on the base;

at least two static contact frames with respective static contacts are soldered to the circuit board and respectively located at two sides of a base cover. The static contacts pass through a top part of the base cover and hangs in the interior housing;

in the interior housing are at least two moving contact sheets which provide moving contacts and are separated by an insulation plate disposed on an unbalancing moving contact frame respectively. A trip lock is disposed at one end of the moving contact frame, and the trip lock is connected to a fasten lock which functions as a balance and allows the moving contacts to separate from and combine with the static contacts; and a upper portion of the fasten lock is hung on the base cover through a rotating axle. A lower portion of the fasten lock passes through the base for being in contact with a tripping solenoid disposed at an exterior bottom of the base. The tripping solenoid and a main control circuit disposed on the circuit board are in an electrical connection.

There is also disclosed the further technical innovation of the present invention, wherein the tripping solenoid includes a coil framework, a tripping coil and a magnetic yoke disposed on the coil framework, a moving iron core, an iron core spring sleeved on one end of the moving iron core, and a push rod frame disposed around the coil framework; wherein the coil framework is hung on the exterior bottom of the base through a fixing device;

wherein a protruding platform is further disposed on the coil framework for a placement of the push rod frame, two sides of the push rod frame are located on the protruding platform, and the push rod frame can have a free reciprocating motion within a space formed between the protruding platform and the exterior bottom of the base; and wherein one end of the moving iron core passes through the coil framework and one side of the magnetic yoke for being located inside the tripping coil, and the other end of the moving iron core with the iron core spring sleeved thereon is disposed out of the tripping coil and jammed into one side of the push rod frame. The other side of the push rod frame is in a free contact with the lower portion of the fasten lock.

There is also disclosed another technical innovation of the present invention, wherein a protrusion with a bevel surface is formed at a middle portion of the fasten lock, and a bottom of the protrusion is formed into a level state to restrict the action of the trip lock;

wherein the lower portion of the fasten lock is bended. One end of a fasten lock spring is in an elastic and free contact with the lower portion of the fasten lock, and the other end thereof is fixed to the base cover.

There is also disclosed another technical innovation of the present invention, wherein a reset button fixing seat with a hollow interior having a top communicated with a bottom is disposed on the base cover, and at least one locking mouth is formed on the reset button fixing seat;

wherein one end of a reset button passes through the reset button fixing seat to be in contact with the moving contact frame. A return spring is sleeved on that end of the reset button. The return spring is limited within the reset button fixing seat;

wherein at least one elastic lock which fits in the locking mouth is disposed at a middle part of the reset button, and the elastic lock is formed into an inverted cone shape, thereby efficiently preventing the reset button from randomly escaping upwards when it is moved downwards and assuring the stability of the closing status; and wherein the other end of the reset button passes through a sealing press plate disposed inside the main housing for being located within a water proof button sealing unit disposed out of the main housing There is also disclosed another technical innovation of the present invention, wherein a test contact sheet is disposed on the base cover. The test contact sheet is elastically in contact with the static contact frame. One end of a test button is in contact with the test contact sheet, and the other end thereof passes through the sealing press plate for being connected to the water proof button sealing unit disposed out of the main housing.

There is also disclosed another technical innovation of the present invention, wherein a tubular body for fixing a high brightness light emitting diode is disposed on the base cover, and two sides of the tubular body forms notches penetrated by solder pins respectively. One end of the solder pin is soldered to the circuit board, and the other end thereof passes through the notch for being connected to the high brightness light emitting diode which is fixed to the tubular body;

wherein the high brightness light emitting diode passes through the sealing press plate for being set inside the indication lampshade which is disposed out of the main housing.

There is also disclosed another technical innovation of the present invention, wherein at least one recess is inwardly formed on an interior bottom of the base, which ensures a safe interstice of opening when the moving contact frame falls;

wherein two limiting members are extended upwardly from the interior bottom of the base and located at two sides of the trip lock respectively, thereby limiting a level swing of the trip lock for ensuring the safety of opening and closing operations.

There is also disclosed another technical innovation of the present invention, wherein a lever fulcrum with a hemispherical top is further disposed on the interior bottom of the base. One end of a contact spring is sleeved on the lever fulcrum, and the other end thereof is fixed to a bottom of the moving contact frame;

wherein a blocking frame is disposed at two sides of the base for limiting displacements of the moving contact frame and the base cover. Preferably, the present invention arranges two pairs of blocking frames at two sides of the base. The base cover and the base are engaged to constitute the interior housing, which allows the moving contact and the static contact to fulfill the opening and the closing operations within an individual space constituted by the interior housing and prevents the electric arcs caused by closing from interfering with the circuit board and the tripping solenoid.

There is also disclosed another technical innovation of the present invention, wherein the main housing comprises a top cover, a bottom seat, and a small bottom cover; wherein the circuit board is disposed on the bottom seat through a fixing pillar, a blocking plate is disposed on the small bottom cover, one end of a connecting terminal for connecting a load is disposed on the blocking plate, and the other end of the connecting terminal is connected to the moving contact sheet;

wherein the bottom seat and the small bottom cover are hermetically connected to the top cover through a surrounding sealing body, and the water proof button sealing unit and the indication lampshade are all disposed on the top cover;

wherein a wire clamping plate is hung on the top cover through a fixing unit and located above the small bottom cover for fixing the output wire; and wherein a conductor sealing ring is hermetically and fixedly disposed between the small bottom cover and the top cover through a wedging unit for executing a hermetical connection of the load wire.

There is also disclosed another technical innovation of the present invention, wherein a peripheral circuit A, a test circuit B, a power switch circuit C, an indication circuit D, a detection and inductance circuit E, a main control circuit F, and a signal amplification circuit G are disposed on the circuit board; wherein the detection and inductance circuit E includes an electricity leakage and electricity shock ground fault detection and inductance circuit E1, a neutral ground fault detection circuit E2, and a short-circuited detection circuit E3. The main control circuit F includes an electricity leakage and electricity shock ground fault control circuit F1, a neutral ground fault control circuit F2, and a short-circuited control circuit F3.

The peripheral circuit A includes a varistor MOV disposed on the circuit board and a power phase wire L and a power neutral wire N connected to a power. The varistor MOV is connected to the power phase wire L and the power neutral wire N for absorbing the pulse voltage in the electrical grid and protecting the circuit.

The test circuit B includes a test resistance R test, a test switch K twst, and a conductor disposed on the circuit board; wherein the resistance R test and the conductor are soldered to the circuit board. The test switch K twst includes the test button and the test contact sheet for inspecting the integrity of the performance of the portable ground fault breaker.

The power switch circuit C includes a double-pole single-throw switch K with a trip-free mechanism disposed inside the interior housing and a tripping solenoid hung on the exterior bottom of the base. The tripping solenoid controls the break of the double-pole single-throw switch K directly to protect the circuit and the load.

The indication circuit D includes a current-limit resistor R7 disposed on the circuit board and a high brightness light emitting diode DL connected to the circuit board through the solder pin for displaying the working status. The shining state of the high brightness light emitting diode DL represents a normal operation, and the non-shining state thereof represents the non-electrification and shows the load with no power output.

The detection and inductance circuit E includes an electricity leakage and electricity shock ground fault detection and inductance circuit E1, a neutral ground fault detection circuit E2, and a short-circuited detection circuit E3; wherein the electricity leakage and electricity shock ground fault detection and inductance circuit E1 and the neutral ground fault detection circuit E2 include zero sequence current mutual inductors T1 and T2 soldered to the circuit board and a power phase wire L and a power neutral wire N passing through T1 and T2. They further include resistances R1 and R2, capacitances C1 and C2, a resistance R5, and capacitances C5 and C6 soldered to the circuit board. When the circumstances of the electricity leakage, the electricity shock, the ground fault, and the neutral ground fault happen to the load wire, T1 and T2 detect, amplify and send the signal to the signal amplification circuit G;

The short-circuited detection circuit E3 includes a ring-shaped mutual inductor T3 soldered to the circuit board, a power phase wire L passing through T3, and a resistance R6, a capacitance C7 and diodes D1-D4 soldered to the circuit board; wherein, every two diodes in a series connection are connected to the short-circuited detection circuit E3. A positive diode voltage of each diode is decreased to 0.7V. When the circuit is short-circuited, T3 detects and inspects the signal, and then the signal is limited and rectified by the diodes D1-D4 and sent to the silicon controlled rectifier for activating and turning on the tripping solenoid to open the moving and the static contacts, thereby interrupting the power.

The signal amplification circuit G includes a resistance R3, a capacitance C3, and an integrated circuit IC disposed on the circuit board. The signal amplification circuit G receives the signals of T1 and T2, executes the signal detection and amplification, analyzes whether the signals are correct to prevent error signals, and thence sends the detected, amplified, and correct signals to the next-grade main control circuit F.

The main control circuit F includes an electricity leakage and electricity shock ground fault control circuit F1, a neutral ground fault control circuit F2, and a short-circuited control circuit F3; wherein, the electricity leakage and electricity shock ground fault control circuit F1 and the neutral ground fault control circuit F2 include a silicon controlled rectifier SCR1, a resistance R4, a capacitance C4, and a bridge rectification circuit DB; wherein the bridge rectification circuit DB is constituted by four diodes. The electricity leakage and electricity shock ground fault control circuit F1 receives the electricity leakage and electricity shock ground fault signal of the former-grade signal amplification circuit G and loads it to the silicon controlled rectifier SCR1. When the circumstances of the ground fault or the neutral ground fault oscillation frequency happen to the load wire, the resistance RSENSE is set as a feedback resistance with a gain and a fault sensibility for maintaining the loop gain and oscillating. The frequency is determined by the coefficient of self-inductance of the mutual inductor with the coil 200:1 of T2 and C5 as well as C6 and RSENSE. The following means is taken at time of adjusting the resistance RSENSE: apply expected error currents and adjust the value of the resistance RSENSE until the silicon controlled rectifier SCR1 activates. Likewisely, a fixing resistance can be adopted as the resistance RSENSE because the variation of sensibility ranging ±15% can also satisfy the regulation scope of 4-6 mA in UL943. The sensibility of the neutral ground fault is adjustable by changing the oscillation frequency. The reduction of the loop gain of the positive feedback circuit can increase the frequency for decreasing the sensibility. When the frequency increases, the signal is attenuated and the loop gain is weakened. When the neutral ground fault happens to the circuit, the resistance is 2Ω or even less. It is amplified and protected through the integrated circuit. In particular, a turn-on threshold voltage of the silicon controlled rectifier SCR1 of the present invention is 0.6V, which is faster than the induction velocity of the silicon controlled rectifier of the current technique. The silicon controlled rectifier SCR1 makes the next-grade circuit through. A tripping coil of the tripping solenoid is electrified to create a magnetic field immediately. Under the action of the magnetic yoke, the aggregated magnetism absorbs the moving iron core swiftly, and the moving iron core drives the push rod frame to move toward the fasten lock quickly. The push rod frame pushes the fasten lock away and compresses the fasten lock spring until the fasten lock separates from the trip lock. The moving contact sheet is unbalanced instantly under the gravity force. Then the end with the moving contact falls into the recess swiftly, whereby an instant break of the moving contact and the static contact is fulfilled to interrupt the circuit and obtain the protection.

The short-circuited control circuit F3 includes a silicon controlled rectifier SCR2 disposed on the circuit board and a resistance R6, a capacitance C7 and diodes D1-D4 disposed on the circuit board. The short-circuited control circuit F3 receives the short-circuited signal sent by the signal amplification circuit G and loads it to the silicon controlled rectifier SCR2 for turning on. In particular, the turn-on threshold voltage of the silicon controlled rectifier SCR2 of the present invention is also 0.6V, which is faster than the induction velocity of the silicon controlled rectifier of the current technique. The silicon controlled rectifier SCR2 makes the next-grade circuit through. A tripping coil of the tripping solenoid is electrified to create a magnetic field immediately. Under the action of the magnetic yoke, the aggregated magnetism absorbs the moving iron core swiftly, and the moving iron core drives the push rod frame to move toward the fasten lock quickly. The push rod frame pushes the fasten lock away and compresses the fasten lock spring until the fasten lock separates from the trip lock. The moving contact sheet is unbalanced instantly under the gravity force. Then the end with the moving contact falls into the recess swiftly, whereby an instant break of the moving contact and the static contact is fulfilled to interrupt the load-side circuit and obtain the protection.

The present invention obtains effects, such as a simple structure, a small bulk, use convenience, and a humanized appearance design. The present invention further provides protections against the electricity leakage, the electricity shock, the ground fault, the neutral ground fault, and the short circuit. The present invention breaks the load-side live wire and the neutral wire concurrently and provides a water-proof protection. The present invention does not generate electric sparks and has the function of obtaining a long duration and being not suitable for heating.

DETAILED DESCRIPTION OF THE PREFERRED EMBODIMENTS

Figure 1:
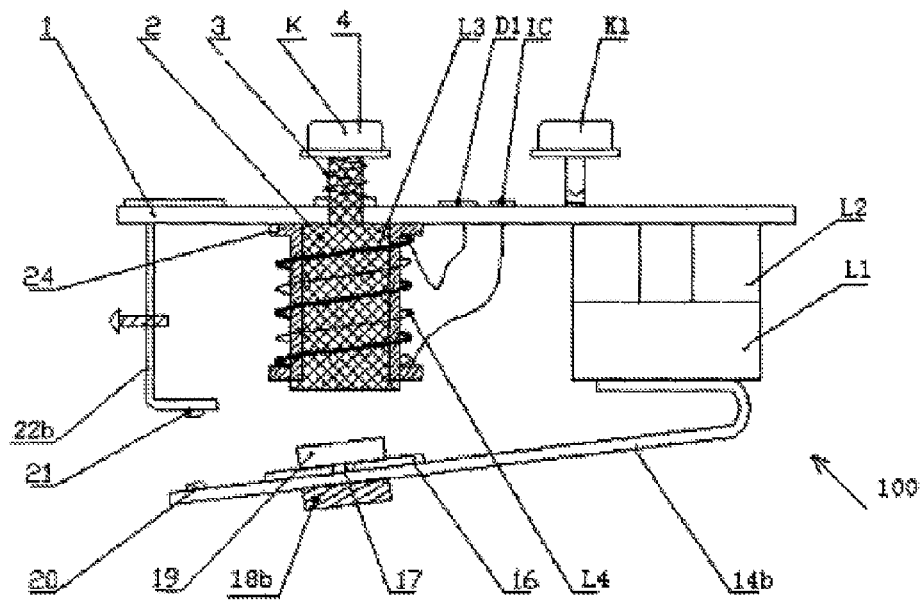
FIG. 1 is a schematic view showing a tripping device of the conventional patent technique.
Figure 2:
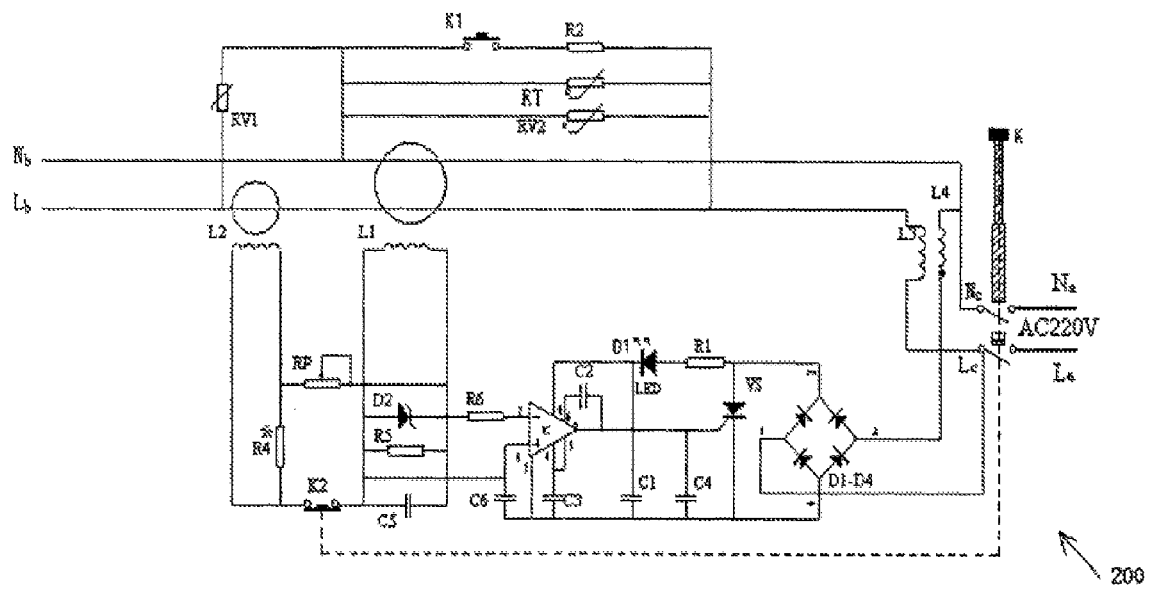
FIG. 2 is a circuit diagram of the conventional patent technique.
Figure 3:
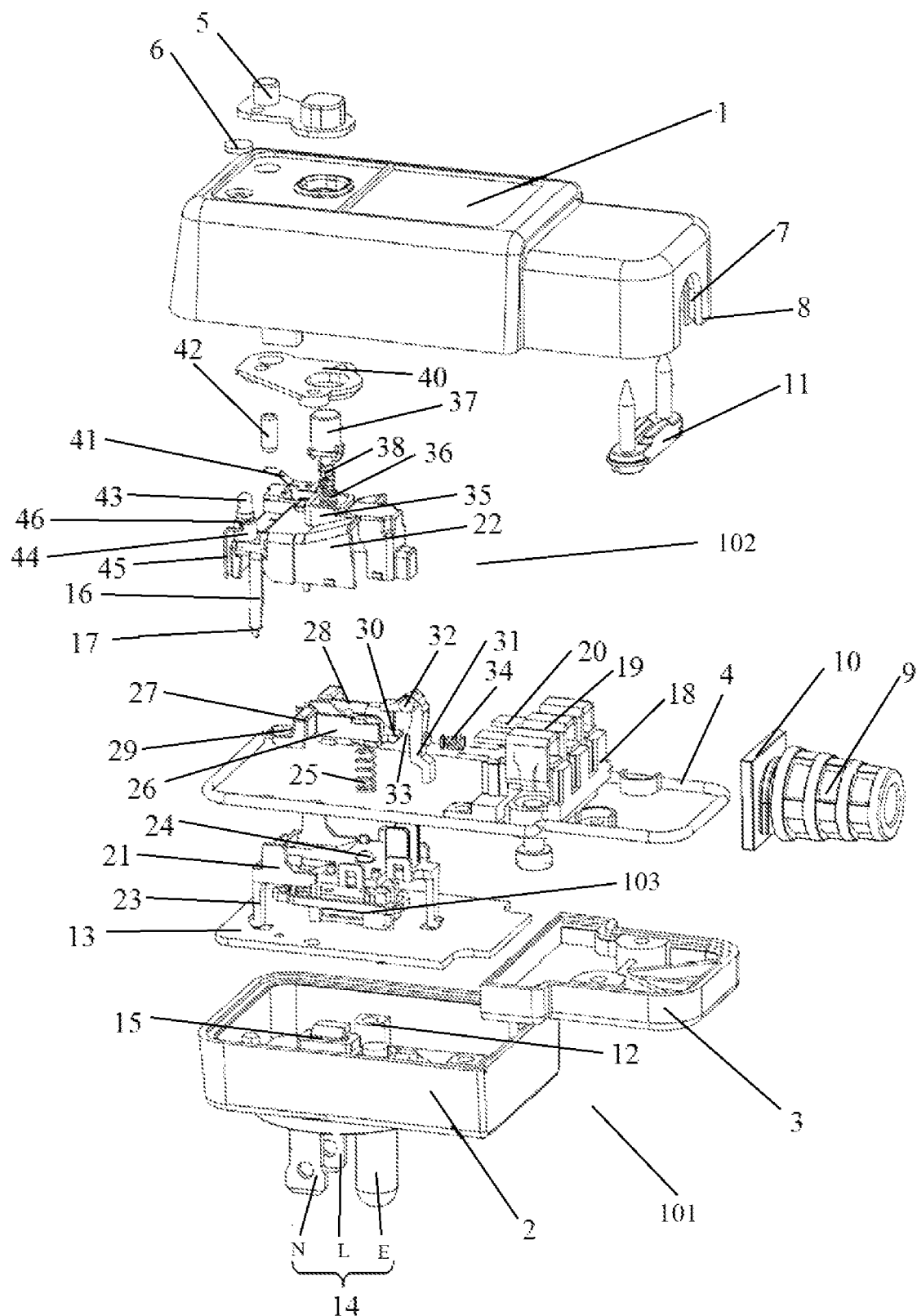
FIG. 3 is a schematic view showing the assemblage of the portable ground fault breaker of the present invention.
Figure 4:
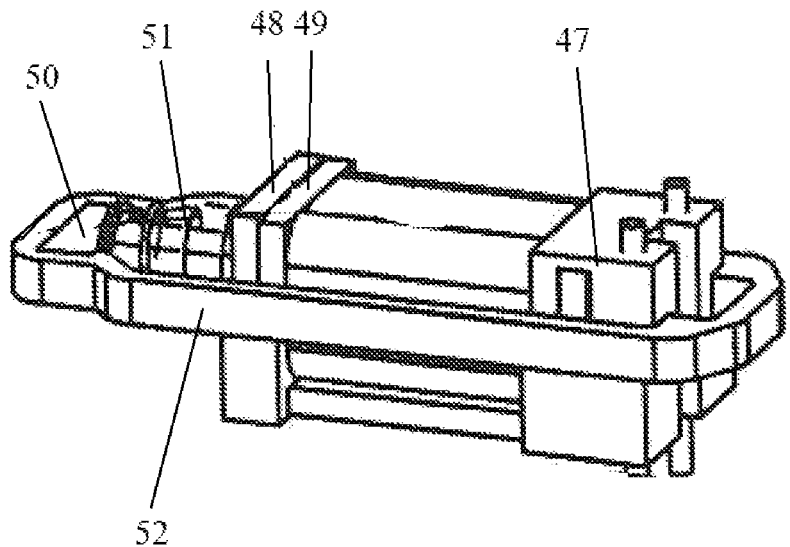
FIG. 4 is a schematic view showing the tripping solenoid of the portable ground fault breaker of the present invention.
Figure 5:
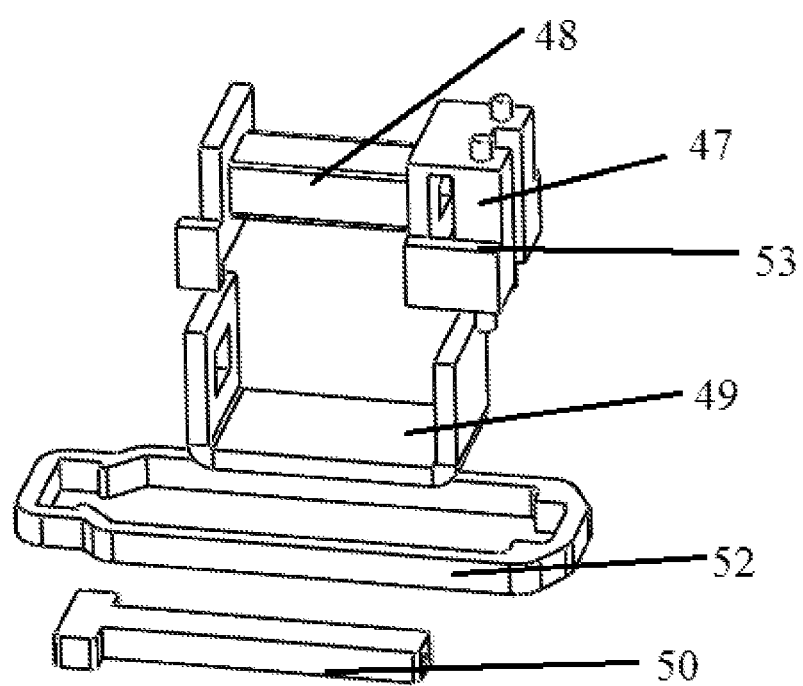
FIG. 5 is a schematic view showing the moving contact of the portable ground fault breaker of the present invention.
Figure 6:
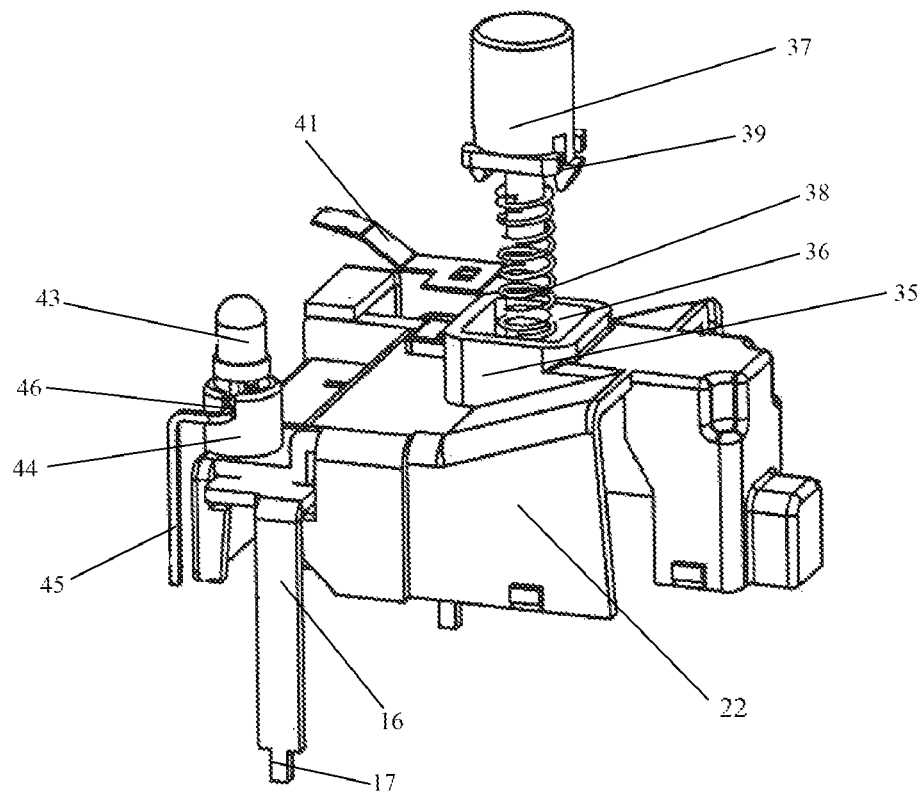
FIG. 6 is a schematic view showing the base cover of the interior housing of the portable ground fault breaker of the present invention.
Figure 7:
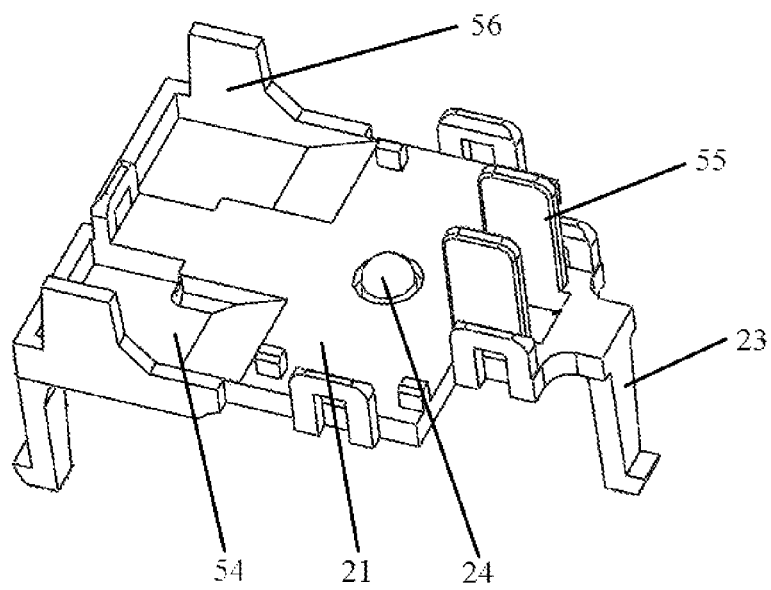
FIG. 7 is a schematic view showing the base of the interior housing of the portable ground fault breaker of the present invention.

The advantages of the present invention over the known prior arts are more apparent to those of ordinary skilled in the art upon reading following descriptions in junction with the drawings.

Referring to FIGS. 3-7, a preferred embodiment 1 of a portable ground fault circuit breaker of the present invention includes a main housing 101. The main housing 101 is constituted by a top cover 1, a bottom seat 2, and a small bottom cover 3; wherein, the bottom seat 2 and the small bottom cover 3 are hermetically connected to the top cover 1 through a surrounding sealing body 4. A water proof button sealing unit 5 and an indication lampshade 6 are disposed on a top of the top cover 1. A conductor sealing ring mouth 8 with a slot 7 is disposed at an end of the top cover 1. A conductor sealing ring 9 is lodged in the conductor sealing ring mouth 8 through a wedging unit 10 disposed thereon to fulfill a hermetical connection of the load wire. A wire clamping plate 11 is located at an inner side of the conductor sealing ring mouth 8 and set above the small bottom cover 3. The wire clamping plate 11 is fixedly disposed in an interior of the top cover 1 through a fixing unit for fixing the output wire.

A fixing pillar 12 is disposed in the middle of an interior of the bottom seat 2 for supporting and fixing a circuit board 13. A pin hole 15 penetrated by a pin 14 is formed on the bottom seat 2. One end of the pin 14 passes through the pin hole 15 for being located out of the bottom seat 2, and the other end thereof is in contact with a static contact frame 16 soldered to the circuit board 13. A static contact 17 is further disposed on the static contact frame 16; wherein the pin 14 includes a power phase wire pin L, a power neutral pin N, and a ground pin E. The power phase wire L, the power neutral pin N, and two static contact frames 16 on the circuit board 13 are correspondingly connected to form a power input end.

A blocking plate 18 is disposed on the small bottom cover 3. A wire connection frame 19 in charge of connecting the load is installed on the blocking plate 18. A connecting plate 20 is disposed on the wire connection frame 19.

An interior housing 102 is further disposed in the main housing 101. The interior housing 102 is constituted by a base 21 and a base cover 22; wherein the base cover 22 is made of polymide 6 (PA6), which can absorb electric arcs caused by a closing operation and prevent electrical accidents. The static contact frame 16 with the static contact 17 penetrates the base cover 22 from two sides of the base cover 22 respectively and inserts into the base cover 22 to be in a hanging status. The base 21 is detachably fixed to the circuit board 13 through three base legs 23. A lever fulcrum 24 with a hemispherical top is further disposed on an interior bottom of the base 21. One end of a contact spring 25 is sleeved on the lever fulcrum 24, and the other end thereof is fixed to a bottom of a moving contact frame 26, which keeps an imbalance of the moving contact frame 26 without having an external balance force.

Two moving contact sheets 27 are respectively disposed at two sides of the moving contact frame 26. The two moving contact sheets 27 are separated by an insulation plate 28. One end of the moving contact sheet 27 sets a moving contact 29, and the other end thereof is connected to the connecting plate 20 through a soft connection for forming a power output connected to the load.

A trip lock 30 is further disposed on the moving contact frame 26. The trip lock 30 is connected to a fasten lock 31 which functions as a balance and drives a separation and a combination between the moving contact 29 and the static contact 17. A upper portion of the fasten lock 31 is hung on the base cover 22 through a rotating axle 32, and a lower portion thereof passes through the base 21 for being in contact with a tripping solenoid 103 hung on an exterior bottom of the base 21. A protrusion 33 with a bevel surface is formed at a middle portion of the fasten lock 31, and a bottom of the protrusion 33 is formed into a level state to restrict the action of the trip lock 30. The lower portion of the fasten lock 31 is bended. One end of a fasten lock spring 34 is in an elastic and free contact with the lower portion of the fasten lock 31, and the other end thereof is fixed to the base cover 22.

A reset button fixing seat 35 with a top communicated with a bottom is disposed on a top of the base cover 22. At least one locking mouth 36 is disposed on the reset button fixing seat 35. One end of a reset button 37 passes through the reset button fixing seat 35 to be in contact with the moving contact frame 26. A return spring 38 is sleeved on the end where the reset button 37 abuts on the moving contact frame 26. The return spring 38 is limited within the reset button fixing seat 35 to fulfill the spring back of the reset button 37. At least one elastic lock 39 which fits in the locking mouth 36 is disposed at a middle part of the reset button 37, and the elastic lock 39 is formed into an inverted cone shape, thereby efficiently preventing the reset button 37 from randomly escaping upwards when it is moved downwards and assuring the stability of the closing status. The other end of the reset button 37 passes through a sealing press plate 40 disposed at the interior of the main housing 1 for being located within a button sealing unit 5.

A test contact sheet 41 is further disposed on the base cover 22. The test contact sheet 41 is elastically in contact with the static contact frame 16. One end of a test button 42 is in contact with the test contact sheet 41, and the other end thereof passes through the sealing press plate 40 for being connected to the water proof button sealing unit 5.

A tubular body 44 for fixing a high brightness light emitting diode 43 is disposed on the base cover 22. Two sides of the tubular body 44 forms notches 46 penetrated by solder pins 45 respectively. One end of the solder pin 45 is soldered to the circuit board 13, and the other end thereof passes through the notch 46 for being connected to the high brightness light emitting diode 43 which is fixed to the tubular body 44. The high brightness light emitting diode 43 penetrates the sealing press plate 40 for being set inside the indication lampshade 6.

The tripping solenoid 103 of the present invention includes a coil framework 47, a tripping coil 48 and a magnetic yoke 49 disposed on the coil framework 47, a moving iron core 50, an iron core spring 51 sleeved on one end of the moving iron core 50, and a push rod frame 52 disposed around the coil framework 47; wherein the coil framework 47 is hung on the exterior bottom of the base 21 through a fixing device.

A protruding platform 53 is further disposed on the coil framework 47 for a placement of the push rod frame 52, two sides of the push rod frame 52 are located on the protruding platform 53, and the push rod frame 53 has a free reciprocating motion within a space formed between the protruding platform 53 and the exterior bottom of the base 21.

One end of the moving iron core 50 passes through the coil framework 47 and one side of the magnetic yoke 49 for being located inside the tripping coil 48, and the other end of the moving iron core 50 with the iron core spring 51 sleeved thereon is disposed out of the tripping coil 48 and jammed into one side of the push rod frame 52. The other side of the push rod frame 52 is in a free contact with the lower portion of the fasten lock 31.

At least one recess 54 is inwardly formed on an interior bottom of the base 21, which ensures a safe interstice of opening when the moving contact frame 26 falls.

Two limiting members 55 are extended upwardly from the interior bottom of the base 21 and located at two sides of the trip lock 30 respectively, thereby limiting a level swing of the trip lock 30 for ensuring the safety of opening and closing operations.

A blocking frame 56 is disposed at two sides of the base 21 for limiting displacements of the moving contact frame 26 and the base cover 22. Preferably, the present invention arranges two pairs of blocking frames 56 at two sides of the base 21. The base cover 22 and the base 21 are engaged to constitute the interior housing 102, which allows the moving contact 29 and the static contact 17 to fulfill the opening and the closing operations within an individual space constituted by the interior housing 102 and prevents the electric arcs caused by closing from interfering with the circuit board 13 and the tripping solenoid 103.

Figure 8:
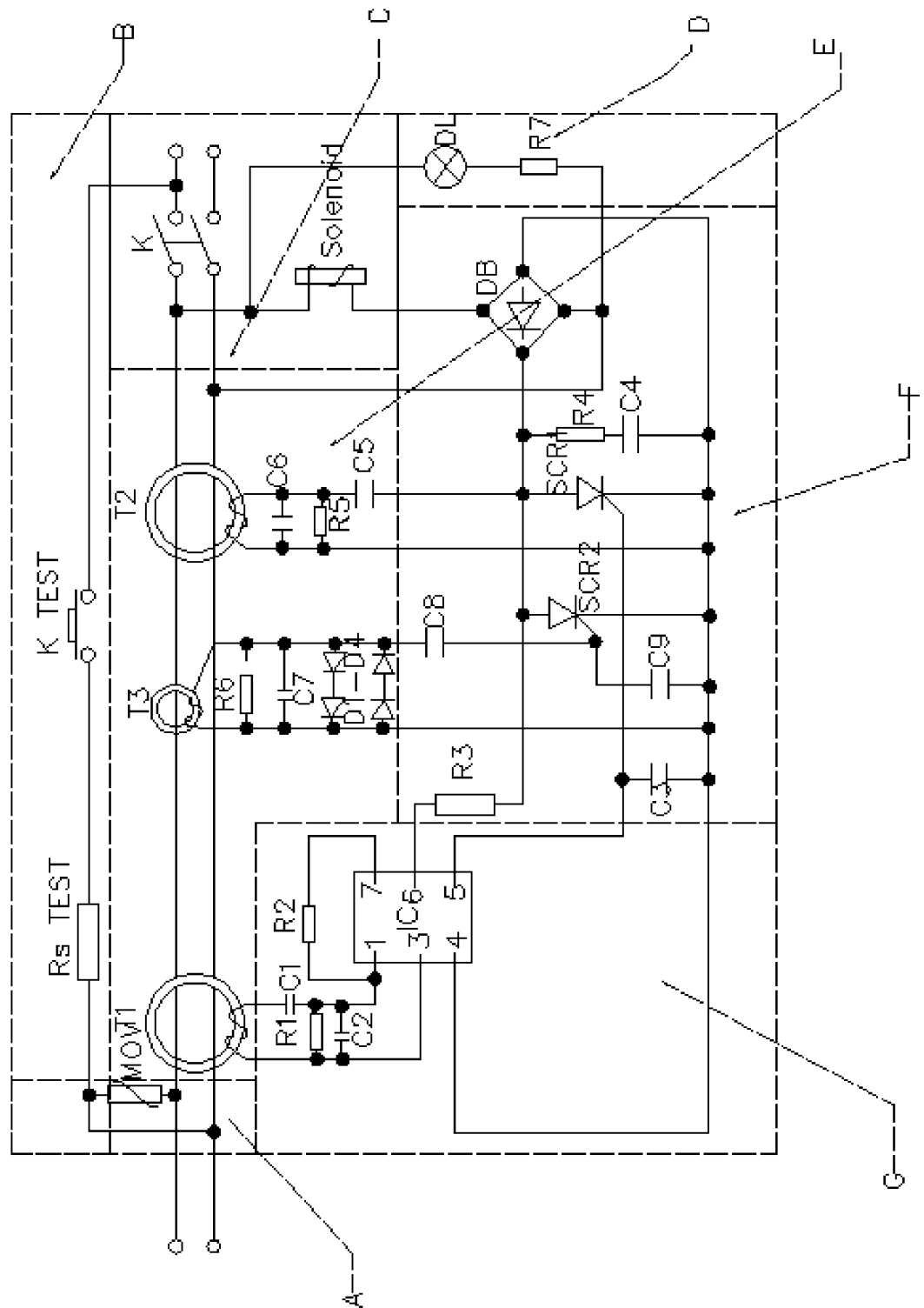
FIG. 8 is a circuit diagram of the portable ground fault breaker of the present invention.

Referring to FIG. 8, a peripheral circuit A, a test circuit B, a power switch circuit C, an indication circuit D, a detection and inductance circuit E, a main control circuit F, and a signal amplification circuit G are disposed on the circuit board 13; wherein the detection and inductance circuit E includes an electricity leakage and electricity shock ground fault detection and inductance circuit E1, a neutral ground fault detection circuit E2, and a short-circuited detection circuit E3. The main control circuit F includes an electricity leakage and electricity shock ground fault control circuit F1, a neutral ground fault control circuit F2, and a short-circuited control circuit F3.

The peripheral circuit A includes a varistor MOV disposed on the circuit board 13 and a power phase wire L and a power neutral wire N connected to a power. The varistor MOV is connected to the power-side power phase wire L and the power neutral wire N for absorbing the pulse voltage in the electrical grid and protecting the circuit.

The test circuit B includes a test resistance R test, a test switch K twst, and a conductor disposed on the circuit board 13; wherein the resistance R test and the conductor are soldered to the circuit board 13. The test switch K twst includes the test button 42 and the test contact sheet 41 for inspecting the integrity of the performance of the portable ground fault breaker.

The power switch circuit C includes a double-pole single-throw switch K disposed inside the interior housing 102 and a tripping solenoid 103 hung on the exterior bottom of the base 21. The tripping solenoid 103 controls the break of the double-pole single-throw switch K directly to protect the circuit and the load.

The indication circuit D includes a current-limit resistor R7 disposed on the circuit board 13 and a high brightness light emitting diode 43 (DL) connected to the circuit board 13 through the solder pin 45 for displaying the working status. The shining state of the high brightness light emitting diode 43 (DL) represents a normal operation, and the non-shining state thereof represents the non-electrification and shows the load with no power output.

The detection and inductance circuit E includes an electricity leakage and electricity shock ground fault detection and inductance circuit E1, a neutral ground fault detection circuit E2, and a short-circuited detection circuit E3; wherein the electricity leakage and electricity shock ground fault detection and inductance circuit E1 and the neutral ground fault detection circuit E2 include a zero sequence current mutual inductor T1 and a mutual inductor T2 soldered to the circuit board 13 and a power phase wire L and a power neutral wire N passing through T1 and T2. They further include resistances R1 and R2, capacitances C1 and C2, a resistance R5, and capacitances C5 and C6 soldered to the circuit board 13. When the circumstances of the electricity leakage, the electricity shock, the ground fault, and the neutral ground fault happen to the load wire, T1 and T2 detect, amplify and send the signal to the signal amplification circuit G.

The short-circuited detection circuit E3 includes a ring-shaped mutual inductor T3 soldered to the circuit board 13, a power phase wire L passing through T3, and a resistance R6, a capacitance C7 and diodes D1-D4 soldered to the circuit board 13; wherein, every two diodes in a series connection are connected to the short-circuited detection circuit E3. A positive diode voltage of each diode is decreased to 0.7V. When the circuit is short-circuited, T3 detects, inspects and amplifies the signal, and then the signal is limited and rectified by the diodes D1-D4 and sent to the silicon controlled rectifier SCR1. The silicon controlled rectifier SCR1 activates and makes the tripping solenoid turned on to open the moving and the static contacts, thereby interrupting the power.

The signal amplification circuit G includes a resistance R3, a capacitance C3, and an integrated circuit IC disposed on the circuit board 13. The signal amplification circuit G receives the signals of T1, T2, and T3, executes the signal detection and amplification, analyzes whether the signals are correct in order to prevent error signals, and thence sends the detected, amplified, and correct signals to the next-grade main control circuit F.

The main control circuit F includes an electricity leakage and electricity shock ground fault control circuit F1, a neutral ground fault control circuit F2, and a short-circuited control circuit F3; wherein, the electricity leakage and electricity shock ground fault control circuit F1 and the neutral ground fault control circuit F2 include a silicon controlled rectifier SCR1 disposed on the circuit board 13, and a resistance R4, capacitances C3 and C4, and a bridge rectification circuit DB disposed on the circuit board 13; wherein the bridge rectification circuit DB is constituted by four diodes. The electricity leakage and electricity shock ground fault control circuit F1 and the neutral ground fault control circuit F2 receive the electricity leakage and electricity shock ground fault signal of the former-grade signal amplification circuit G and load it to the silicon controlled rectifier SCR1 for turning on. In particular, a turn-on threshold voltage of the silicon controlled rectifier SCR1 of the present invention is 0.6V, which is faster than the induction velocity of the silicon controlled rectifier of the current technique. The silicon controlled rectifier SCR1 makes the next-grade circuit through. A tripping coil 48 of the tripping solenoid 103 is electrified to create a magnetic field immediately. Under the action of the magnetic yoke 49, the aggregated magnetism absorbs the moving iron core 50 swiftly, and the moving iron core 50 drives the push rod frame 52 to move toward the fasten lock 31 quickly. The push rod frame 52 pushes the fasten lock 31 away and compresses the fasten lock spring 34 until the fasten lock 31 separates from the trip lock 30. The moving contact sheet 26 is unbalanced instantly under the gravity force. Then the end with the moving contact 29 falls into the recess 54 swiftly, whereby an instant break of the moving contact 29 and the static contact 17 is fulfilled to interrupt the circuit and obtain the protection.

The short-circuited control circuit F3 includes a silicon controlled rectifier SCR2 disposed on the circuit board 13 and a resistance R6, a capacitance C7 and diodes D1-D4 disposed on the circuit board 13. The short-circuited control circuit F3 receives the short-circuited signal and loads it to the silicon controlled rectifier SCR2 for turning on. In particular, the turn-on threshold voltage of the silicon controlled rectifier SCR2 of the present invention is also 0.6V, which is faster than the induction velocity of the silicon controlled rectifier of the current technique. The silicon controlled rectifier SCR2 makes the next-grade circuit through. A tripping coil 48 of the tripping solenoid 103 is electrified to create a magnetic field immediately. Under the action of the magnetic yoke 49, the aggregated magnetism absorbs the moving iron core 50 swiftly, and the moving iron core 50 drives the push rod frame 52 to move toward the fasten lock 31 quickly. The push rod frame 52 pushes the fasten lock 31 away and compresses the fasten lock spring 34 until the fasten lock 31 separates from the trip lock 30. The moving contact sheet 26 is unbalanced instantly under the gravity force. Then the end with the moving contact 29 falls into the recess 54 swiftly, whereby an instant break of the moving contact 29 and the static contact 17 is fulfilled to interrupt the circuit and obtain the short-circuited protection.

The operation principle and steps of the present invention are shown in the following description. According to the above technical measure, the assemblage of the portable ground fault breaker is completed to make sure that the main control circuit F and the tripping solenoid 103 fulfill an electrical connection and the breaker is connected to the load.

When the reset button 37 is pressed, the push of the reset button 37 compresses the contact spring 25 and the fasten lock spring 34 concurrently. The moving contact frame 26 brings the trip lock 30 sliding downwardly along the middle bevel surface of the fasten lock 31 until the trip lock 30 goes across the protrusion 33 and the trip lock 30 is stably positioned on the level bottom of the protrusion 33 of the fasten lock 31 under the elasticity of the fasten lock spring 34. At the same time, the moving contact frame 26 drives the moving contact 29 to be in a dense contact with the static contact 17 hung in the interior housing 102 under the action of the lever fulcrum 24, thereby obtaining a closing operation. Likewisely, the elastic lock 39 on the reset button 37 is lodged in the locking mouth 36. If the portable ground fault breaker connects a power, the circuit can be turned on. Obviously, the present invention can press the reset button 37 to obtain the closing operation firstly and then make the portable ground fault breaker connect the power.

When the electricity leakage, the electricity shock, the ground fault, and the neutral ground fault oscillation frequency happen to the circuit, the detection and inductance circuit E detects the related information firstly and then sends the information to the signal amplification circuit G. The signal amplification circuit G inspects, amplifies, then analyzes whether the signal is correct, and thence sends the signal to the main control circuit F. The main control circuit F drives the silicon controlled rectifier SCR1 or SCR2 to turn on, which allows the tripping coil 48 of the tripping solenoid 103 to be electrified in order to create a magnetic field immediately. Under the action of the magnetic yoke 49, the aggregated magnetism absorbs the moving iron core 50 swiftly, and the moving iron core 50 drives the push rod frame 52 to move toward the fasten lock 31 quickly. The push rod frame 52 pushes the fasten lock 31 away and compresses the fasten lock spring 34 until the fasten lock 31 separates from the trip lock 30. The moving contact sheet 26 is unbalanced instantly under the gravity force. Then the end with the moving contact 29 falls into the recess 54 swiftly, whereby an instant break of the moving contact 29 and the static contact 17 is fulfilled to interrupt the circuit and obtain the protection.

When the moving contact frame 26 drives the moving contact 29 to fall into the recess 54, three resistant forces will need to be overcome for spring back: 1. a force of the bevel surface at the middle portion of the fasten lock 31 against the trip lock 30; 2. a force compressing the fasten lock spring 34; and 3. a force pushing the reset button 37. Consequently, once the moving contact 29 separates from the static contact 17 instantly, it is impossible to obtain the closing operation by spring back automatically. If the closing operation is to be executed, the reset button 37 must be manually actuated. Furthermore, the closing operation is conducted in the individual space constituted by the interior housing 102, so it does not interfere with the circuit board 13 or the tripping solenoid 103. Therefore, the opening operation and the closing operation are very safe and reliable.

Figure 9:
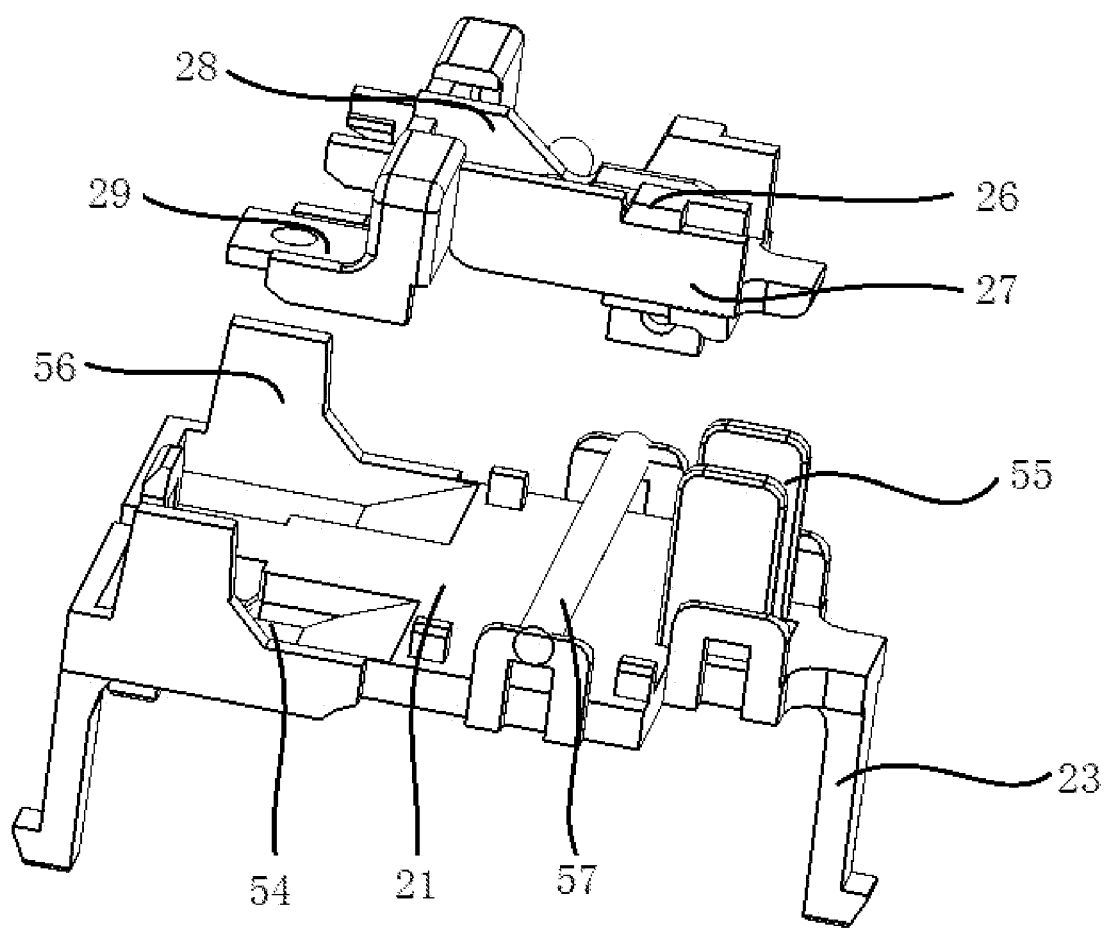
FIG. 9 is a schematic view showing the modification of the structure in the preferred embodiment 2 of the portable ground fault breaker of the present invention.

Referring to FIG. 9, a preferred embodiment 2 of the present invention still comprises the main structure and principle the same as the preferred embodiment 1, which are herein omitted. The following contents describe the improvement in this preferred embodiment.

In this embodiment, the moving contact frame 26 is installed on the blocking frame 56 through a fixing axle 57, namely the fixing axle 57 passes through the base cover 22, the moving contact sheet 27, and the moving contact frame 26 and provides two ends thereof fixedly disposed to a top end of the blocking frame 56 at two sides of the base 21 for allowing the moving contact sheet 27 and the moving contact frame 26 to rotate freely. The reset button 37 is in contact with the trip lock 30. The closing operation can be easily executed by pressing the reset button 37, thereby saving costs and reducing the weight by omitting the arrangement of the contact spring 25 and the lever fulcrum 24.

Figure 10:
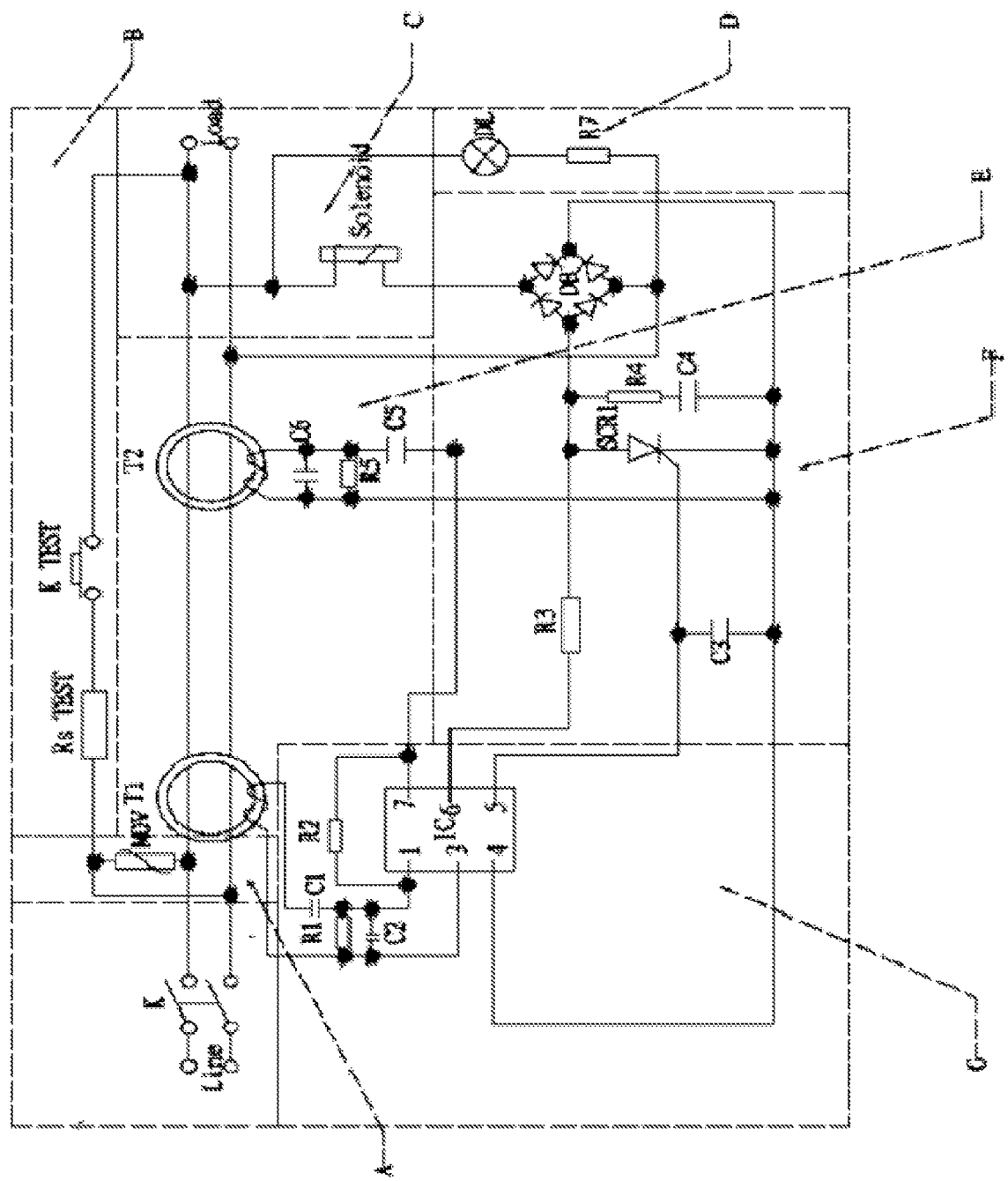
FIG. 10 is a circuit diagram in the preferred embodiment 3 of the portable ground fault breaker of the present invention.
Figure 11:
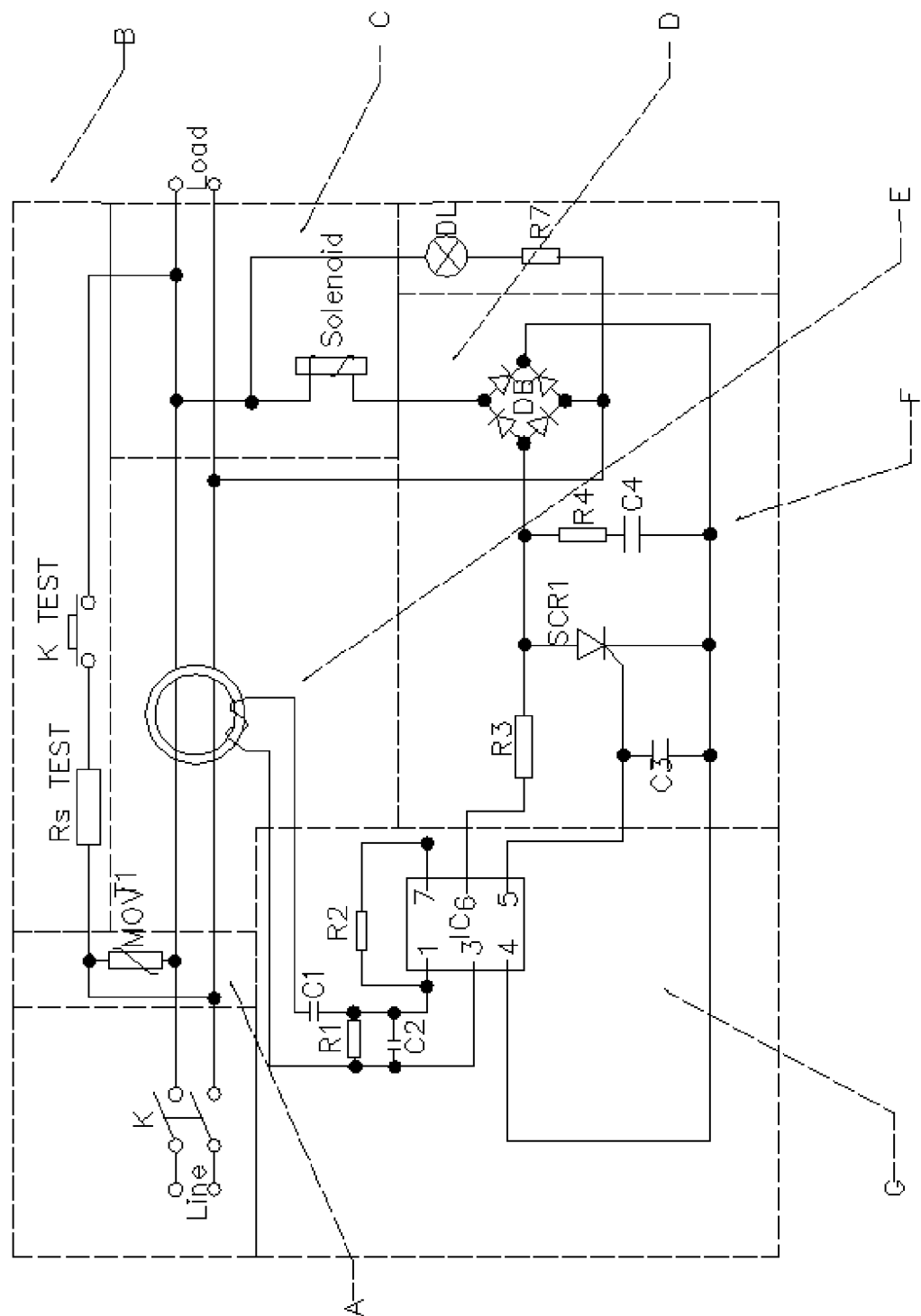
FIG. 11 is a circuit diagram in the preferred embodiment 3 of the portable ground fault breaker of the present invention.

Referring to FIG. 10 and FIG. 11, a preferred embodiment 3 of the present invention still comprises the main structure and principle the same as the preferred embodiment 1, which are herein omitted. The following contents describe the improvement in this preferred embodiment.

In this embodiment, the peripheral circuit A, the test circuit B, the power switch circuit C, the indication circuit D, the detection and inductance circuit E, the main control circuit F, and the signal amplification circuit G are still disposed on the circuit board 13; wherein the detection and inductance circuit E still includes an electricity leakage and electricity shock ground fault detection and inductance circuit E1 and a neutral ground fault detection circuit E2. Herein, a short-circuited detection circuit E3 is not included. The main control circuit F still includes an electricity leakage and electricity shock ground fault control circuit F1 and a neutral ground fault control circuit F2. Herein, a short-circuited control circuit F3 is not included.

The peripheral circuit A includes a varistor MOV disposed on the circuit board 13 and a power phase wire L and a power neutral wire N connected to a power. The varistor MOV is connected to the power phase wire L and the power neutral wire N for absorbing the pulse voltage in the electrical grid and protecting the circuit.

The test circuit B includes a test resistance R test, a test switch K twst, and a conductor disposed on the circuit board 13; wherein the resistance R test and the conductor are soldered to the circuit board 13. The test switch K twst includes the test button 42 and the test contact sheet 41 for inspecting the integrity of the performance of the portable ground fault breaker.

The power switch circuit C includes a double-pole single-throw switch K disposed inside the interior housing 102 and a tripping solenoid 103 hung on the exterior bottom of the base 21. The tripping solenoid 103 controls the break of the double-pole single-throw switch K directly to protect the circuit and the load.

The indication circuit D includes a current-limit resistor R7 disposed on the circuit board 13 and a high brightness light emitting diode 43 (DL) connected to the circuit board 13 through the solder pin 45 for displaying the working status. The shining state of the high brightness light emitting diode 43 (DL) represents a normal operation, and the non-shining state thereof represents the non-electrification and shows the load with no power output.

The electricity leakage and electricity shock ground fault detection and inductance circuit E1 and the neutral ground fault detection circuit E2 include zero sequence current mutual inductors T1 and T2 soldered to the circuit board 13 and a power phase wire L and a power neutral wire N passing through T1 and T2. They further include resistances R1, capacitances C1 and C2, a resistance R5, and capacitances C5 and C6 soldered to the circuit board 13. When the circumstances of the electricity leakage, the electricity shock, the ground fault, and the neutral ground fault happen to the load wire, T1 and T2 detect, amplify and send the signal to the signal amplification circuit G.

The signal amplification circuit G includes resistances R2 and R3, a capacitance C3, and an integrated circuit IC disposed on the circuit board 13. The signal amplification circuit G receives the signals of T1 and T2, executes the signal detection and amplification, analyzes whether the signals are correct in order to prevent error signals, and thence sends the detected, amplified, and correct signals to the next-grade main control circuit F.

The electricity leakage and electricity shock ground fault control circuit F1 and the neutral ground fault control circuit F2 include a silicon controlled rectifier SCR1 disposed on the circuit board 13, and a resistance R4, capacitances C3 and C4, and a bridge rectification circuit DB disposed on the circuit board 13; wherein the bridge rectification circuit DB is constituted by four diodes. The electricity leakage and electricity shock ground fault control circuit F1 receives the electricity leakage and electricity shock ground fault signal of the former-grade signal amplification circuit G and loads it to the silicon controlled rectifier SCR1 for turning on. In particular, a turn-on threshold voltage of the silicon controlled rectifier SCR1 of the present invention is 0.6V, which is faster than the induction velocity of the silicon controlled rectifier of the current technique. The silicon controlled rectifier SCR1 makes the next-grade circuit through. A tripping coil 48 of the tripping solenoid 103 is electrified to create a magnetic field immediately. Under the action of the magnetic yoke 49, the aggregated magnetism absorbs the moving iron core 50 swiftly, and the moving iron core 50 drives the push rod frame 52 to move toward the fasten lock 31 quickly. The push rod frame 52 pushes the fasten lock 31 away and compresses the fasten lock spring 34 until the fasten lock 31 separates from the trip lock 30. The moving contact sheet 26 is unbalanced instantly under the gravity force. Then the end with the moving contact 29 falls into the recess 54 swiftly, whereby an instant break of the moving contact 29 and the static contact 17 is fulfilled to interrupt the circuit and obtain the protection.

While we have shown and described the present invention with reference to the specific preferred embodiment, it should be clear to those skilled in the art that further embodiments may be made without departing from the scope of the present invention.

What is claimed is:

1. A portable ground fault circuit breaker including a main housing, characterized in that an interior housing is further disposed inside said main housing and comprises a base and a base cover; said interior housing being fixedly disposed on a circuit board in said main housing via a base leg which is disposed on said base;

at least two static contact frames with respective static contacts being disposed on said circuit board, wherein said static contacts passes through a top part of said base cover and hangs in said interior housing;

at least two moving contact sheets which provide moving contacts and are separated by an insulation plate being disposed on an unbalancing moving contact frame in said interior housing respectively, a trip lock being disposed at one end of said moving contact frame, and said trip lock being connected to a fasten lock which functions as a balance and allows said moving contacts to separate from and combine with said static contacts; and a upper portion of said fasten lock being hung on said base cover through a rotating axle, a lower portion of said fasten lock passing through said base for being in contact with a tripping solenoid disposed at an exterior bottom of said base, said tripping solenoid and a main control circuit disposed on said circuit board being in an electrical connection.

2. The portable ground fault circuit breaker as claimed in claim 1, wherein said tripping solenoid includes a coil framework, a tripping coil and a magnetic yoke disposed on said coil framework, a moving iron core, an iron core spring sleeved on one end of said moving iron core, and a push rod frame disposed around said coil framework, wherein said coil framework is hung on said exterior bottom of said base through a fixing device;

a protruding platform being further disposed on said coil framework for a placement of said push rod frame, and two sides of said push rod frame being located on said protruding platform;

a space being formed between said protruding platform and said exterior bottom of said base for allowing a free reciprocating motion of said push rod frame;

one end of said moving iron core passing through said coil framework and one side of said magnetic yoke for being located inside said tripping coil, and the other end of said moving iron core with said iron core spring sleeved thereon being disposed out of said tripping coil and jammed into one side of said push rod frame; and the other side of said push rod frame being in a free contact with said lower portion of said fasten lock.

3. The portable ground fault circuit breaker as claimed in claim 1, wherein a protrusion with a bevel surface is formed at a middle portion of said fasten lock, and a bottom of said protrusion is formed into a level state; and said lower portion of said fasten lock being bended, one end of a fasten lock spring being in an elastic and free contact with said lower portion of said fasten lock, and the other end thereof being fixed to said base cover.

4. The portable ground fault circuit breaker as claimed in claim 1, wherein a reset button fixing seat with a hollow interior having a top communicated with a bottom is disposed on said base cover, and at least one locking mouth is formed on said reset button fixing seat;

one end of a reset button with a return spring sleeved thereon passing through said reset button fixing seat to be in contact with said moving contact frame, and the other end thereof passing through a sealing press plate which is disposed inside said main housing for being located within a button sealing unit which is disposed out of said main housing;

at least one elastic lock which fits in said locking mouth being disposed at a middle part of said reset button, and said elastic lock being formed into an inverted cone shape; and said return spring being limited within said reset button fixing seat.

5. The portable ground fault circuit breaker as claimed in claim 4, wherein a test contact sheet is disposed on said base cover; one end of a test button being in contact with said test contact sheet, and the other end thereof passing through said sealing press plate for being set within said button sealing unit.

6. The portable ground fault circuit breaker as claimed in claim 1, wherein a tubular body for fixing a high brightness light emitting diode is disposed on said base cover, and two sides of said tubular body forms notches penetrated by solder pins respectively; one end of said solder pin being soldered to said circuit board, and the other end thereof passing through said notch for being connected to said high brightness light emitting diode which is fixed to said tubular body.

7. The portable ground fault circuit breaker as claimed in claim 1, wherein at least one recess is inwardly formed on an interior bottom of said base.

8. The portable ground fault circuit breaker as claimed in claim 1, wherein limiting members are extended upwardly from an interior bottom of said base and located at two sides of said trip lock respectively.

9. The portable ground fault circuit breaker as claimed in claim 1, wherein a lever fulcrum with a hemispherical top is further disposed on an interior bottom of said base, one end of a contact spring is sleeved on said lever fulcrum, and the other end thereof is fixed to a bottom of said moving contact frame.

10. The portable ground fault circuit breaker as claimed in claim 1, wherein a blocking frame is disposed at two sides of said base for limiting displacements of said moving contact frame and said base cover.

11. The portable ground fault circuit breaker as claimed in claim 10, wherein said moving contact frame is installed on said blocking frame through a fixing axle.

12. The portable ground fault circuit breaker as claimed in claim 1, wherein said main housing comprises a top cover, a bottom seat, and a small bottom cover, and said circuit board is disposed on said bottom seat through a fixing pillar;

a blocking plate being disposed on said small bottom cover, one end of a connecting terminal for connecting a load being disposed on said blocking plate, and the other end of said connecting terminal being connected to said moving contact sheet;

a wire clamping plate above said small bottom cover being hung on said top cover; and said bottom seat and said small bottom cover being hermetically connected to said top cover through a surrounding sealing body.

13. The portable ground fault circuit breaker as claimed in claim 1, wherein a peripheral circuit A, a test circuit B, a power switch circuit C, an indication circuit D, a detection and inductance circuit E, a main control circuit F, and a signal amplification circuit G are disposed on said circuit board, said detection and inductance circuit E including an electricity leakage and electricity shock ground fault detection and inductance circuit E1, a neutral ground fault detection circuit E2, and a short-circuited detection circuit E3; and said main control circuit F including an electricity leakage and electricity shock ground fault control circuit F1, a neutral ground fault control circuit F2, and a short-circuited control circuit F3.

* * * * *